No. 793,712. PATENTED JULY 4, 1905.
J. CAHILL.
SHUTTER OR CLOSURE.
APPLICATION FILED MAR. 29, 1904.
2 SHEETS—SHEET 1.
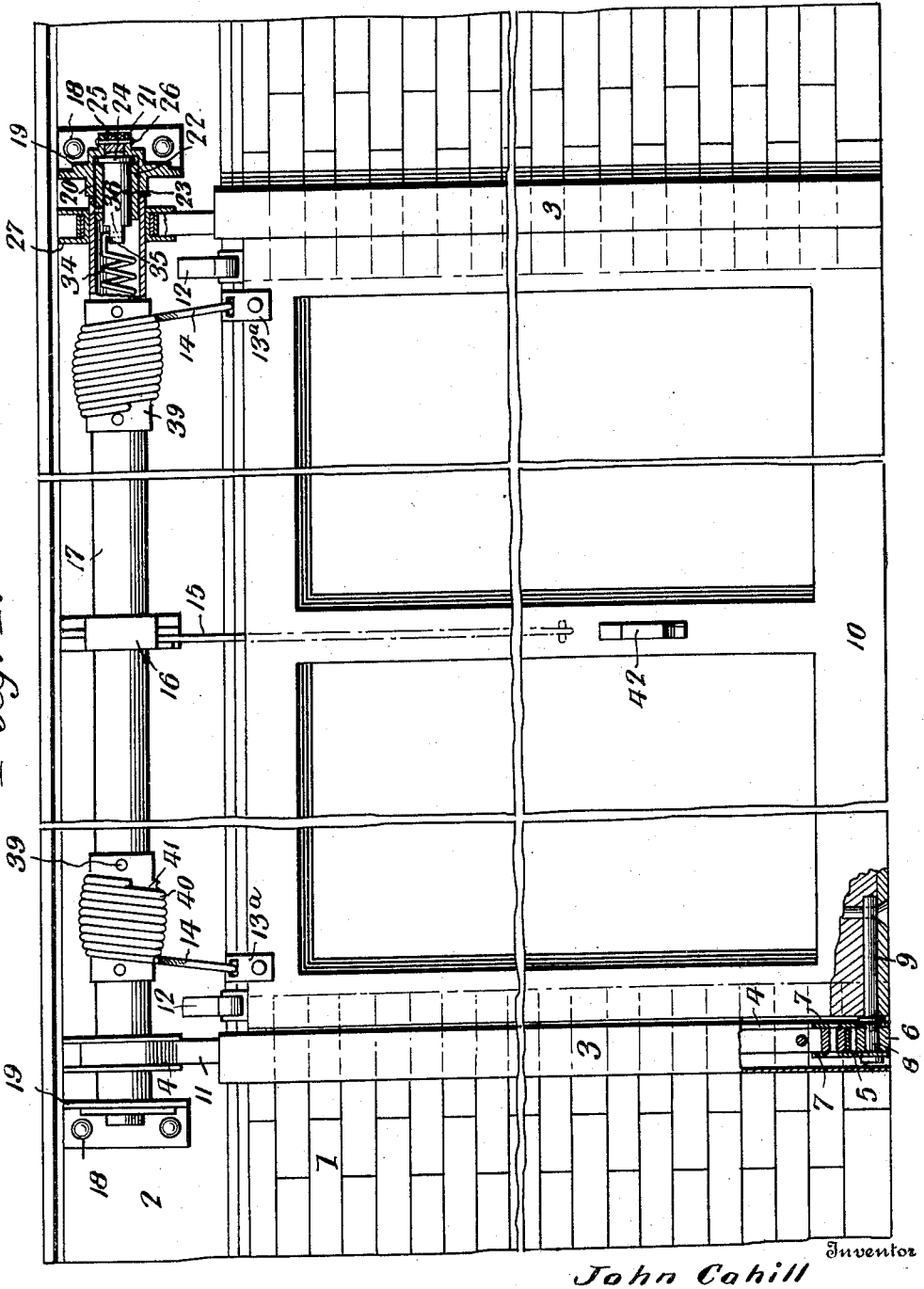
Witnesses
F. W. Riley.
Chas. S. Hyer.
Inventor
John Cahill
By Victor J. Evans
Attorney

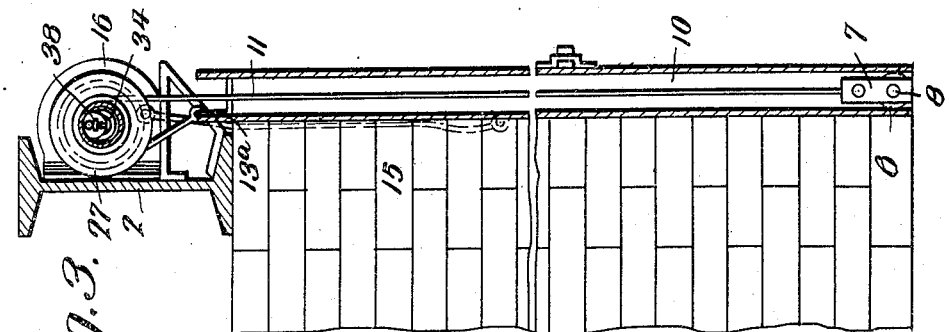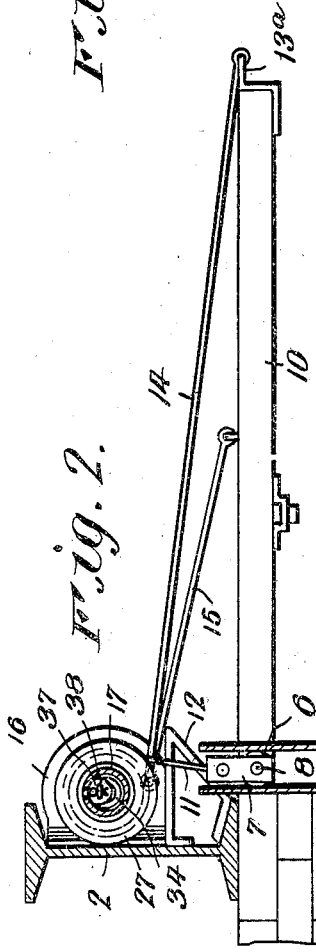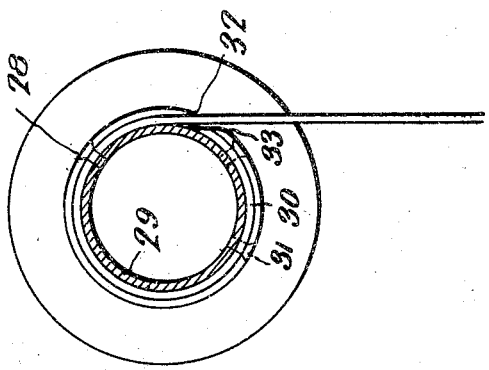

No. 793,712. Patented July 4, 1905.

UNITED STATES PATENT OFFICE.

JOHN CAHILL, OF NORFOLK, VIRGINIA.

SHUTTER OR CLOSURE.

SPECIFICATION forming part of Letters Patent No. 793,712, dated July 4, 1905.

Application filed March 29, 1904. Serial No. 200,651.

*To all whom it may concern:*

Be it known that I, JOHN CAHILL, a citizen of the United States, residing at Norfolk, in the county of Norfolk and State of Virginia, have invented new and useful Improvements in Shutters or Closures, of which the following is a specification.

This invention relates to shutters or closures for windows, doors, and other openings; and the primary object of the same is to provide a simple organization of elements, including a slidable shutter or closure, whereby the shutter or closure will have a counterbalancing operation, particularly when assuming an open position, and materially remove strain and wear and tear from the operating elements connected thereto.

A still further object of the invention is to provide a shutter or closure which is caused to assume an open position and is sustained in a horizontal plane without the use of tracks or holding devices other than the suspending elements and fulcrum devices attached to opposite portions thereof.

A further object of the invention is to provide a shutter or closure for an opening which will be automatically outturned when elevated to open position and sustained in a horizontal plane by suspending devices coöperating with a resiliently-controlled means, the latter having a predetermined arrangement and adjustment to counterbalance the weight of the shutter or closure not only during a full-open position thereof, but also when the shutter or closure is partially elevated similar to the operation of a counterbalanced window-sash.

A still further object of the invention is to provide a shutter or closure which is so arranged that by a simple swinging movement may be caused to become open and in a raised position.

A still further object of the invention is to provide a shutter or closure having slidable fulcrum means at one end or portion and suspending devices at the opposite portion, the said suspending devices automatically winding and unwinding in proportion to the movement of the shutter or closure toward or away from the mechanism or rotatable supporting means for the said suspending devices.

With these and other objects and advantages in view the invention consists in the construction and arrangement of the several parts, which will be more fully hereinafter set forth.

In the drawings, Figure 1 is a front elevation of a portion of a building or other structure, showing the improved shutter and operating mechanism therefor applied thereto, a portion of the shutter and operating mechanism being broken away and the shutter shown closed. Fig. 2 is a transverse vertical section through the arrangement of parts shown by Fig. 1 and illustrating the shutter in open position. Fig. 3 is a view similar to Fig. 2, illustrating the shutter closed. Fig. 4 is a transverse vertical section through a part of the mechanism.

Similar numerals of reference are employed to indicate corresponding parts in the several views.

The numeral 1 designates the wall of a suitable structure having therein a window or other opening and a girder, cornice, or other means 2 thereon. It will be understood that the invention is not limited in its application to any precise construction of wall or supporting means for the upper operating mechanism, and the precise arrangement of parts illustrated in the accompanying drawings for the purpose of demonstrating one practical application of the invention may be modified and varied at will. Suitably secured to the wall at a distance from the opposite side terminals of the opening to be covered are box-guides 3, having slots 4 in their inner sides extending throughout the vertical length thereof, one slot being formed in each guide. The contour of these guides 3 may be changed, and the length and dimensions thereof will be modified proportionately to the movement of the shutter or closure and the size of the latter. Within the guides 3 antifrictional slides 5 are arranged and have lower rollers 6 held between opposite supports or plates 7 by the outwardly-projecting terminals 8 of trunnion-pins 9, projecting outwardly from opposite ends of a shutter or closure 10 near the lower edge of the latter. This shutter 10 may be of any preferred construction and composed entirely of either metal or wood or of both materials. The outer projecting ends 6 of the trunnion-pins are movable in the plates 7 and the rollers 6, through which they pass, to permit the shutter or closure 10 to swing outwardly and inwardly with relation to the opening adapted to be controlled thereby, as will be more fully hereinafter explained. The diameter of the roller 6 is materially greater than the width of the plates 7, so that the said roller will contact with the inner and outer portions of the guides and prevent jamming of the slides in the said guides. Connected to the upper terminals of the slides 5 are the lower ends of bronze or other metal straps 11, which engage upper winding devices. Secured to the wall 1 inside of and close to the upper terminals of the guides 3 are deflectors 12, having outwardly-inclined overhanging members with which the upper edge of the shutter or closure 10 is adapted to contact. Secured to the upper end of the shutter or closure are clips or attaching-plates 13ª, having upper slotted ends in which are secured suspending cords or cables 14, also engaging a winding mechanism, which will be presently set forth. The suspending cords or cables 14 exert a drawing tension against the outer side of the shutter or closure 10, and loosely connected to the intermediate or central portion of the inner side of said shutter or closure is a counteracting cord or cable 15, which depends from an attaching-bracket or analogous device 16, held by the girder, cornice, or other means 2. The rope or cable 15 does not have a winding connection, but is long enough to permit the shutter or closure to unretardingly descend to its lowest position.

There are many mechanisms that could be employed for coöperating with the straps 11 and cords or cables 14 to wind said parts or permit unwinding of the latter to compensate for the closing and opening movements of the shutter or closure; but whatever mechanism may be used will be of such nature as to permit the salient operations of the shutter or closure to be pursued during the opening and closing movements thereof. Such winding and unwinding mechanism will be constructed and arranged to effect a counterbalance for the shutter or closure without straining or injuring such mechanism or any part thereof. Irrespective of the precise nature of the winding and unwinding mechanism, a preferred form of which will be hereinafter set forth, the shutter or closure when raised will be gradually thrown outwardly from the wall or other support 1 by first striking the deflectors 12, and during such operation the antifrictional slides 5 will move upwardly through the guides 3, the straps 11 taken up by winding on the devices with which they coöperate, and the cords or cables 14 will gradually unwind in proportion to the movement in an outward direction of the upper end of the shutter or closure. The outward movement of the shutter or closure will continue until the latter assumes a horizontal position, and at such time the antifrictional slides 5 will have reached the upper ends of the guides, and the counteracting cord or cable 15 will then exert a sustaining tension on the intermediate part of the shutter or closure and not only prevent the latter from sagging or bending at the center, but assist in holding the said shutter or closure in true horizontal position and relieve the cords or cables 14 of a material portion of the weight strain, this relief of strain on the cords or cables 14 being present to such an extent as to be equalized or counterbalanced by the resisting means embodied in the winding devices or mechanism. When the shutter or closure has arrived at a certain point in the guides, the winding mechanism coöperating therewith is relieved of overbalancing strain by an automatic operation of the shutter, which is due to the preponderance of the weight at the outwardly-projected end thereof at such time, and such weight causes the slides 5 to move upwardly without relying upon the winding mechanism.

The preferred form of winding mechanism consists of a tubular shaft or spindle 17, which is held by opposite brackets 18, secured to the cornice or other supporting means 2. Each of these brackets has inner flanges 19 with openings therethrough, and the flange of one of the brackets has an inwardly-projecting collar 20 and an outwardly-extending angular socket 21. Fitted in and secured to the end of the spindle or shaft 17 adjacent to the bracket having the collar 20 is a sleeve 22, which also projects through the said collar 20 and a portion of the opening in the bracket, and loosely extending through the sleeve 22 is a plug 23, having an outer circumferential shoulder 24 in close engagement with the collar 22 and an angular head 25, which is fitted in the socket 21 and immovably held in the latter by a pin 26, extending through said socket and head. The opposite bracket 18 is without the collar 20 or other specific features just explained in connection with the plug 23, the end of the spindle or shaft engaging the bracket 18 without the collar 20, having a simple rotative connection with said latter bracket through the medium of a plug secured to the shaft or spindle and rotatively engaging the bracket. By means of the plug 23, sleeve 22, and the bracket having the collar 20 and a socket for securing the plug in immovable position the strain of the resilient means, which will be hereinafter set forth, as well as of the winding and unwinding operations, is removed from the spindle or shaft to a material extent, and, furthermore, a convenient and positive means is provided for the attachment of one end of the resilient means, as will now be described. On the spindle or shaft 17 adjacent to the brackets flanged winding-drums 27 are secured and are engaged by the straps or bands 11, which pass thereover from the front toward the rear. The particular construction of these drums is clearly shown by Fig. 4 and consists in arranging between the flanges thereof an inclosing shell 28 at a distance from the core or hub 29, the upper extremity 30 of each band or strap 11 being held between the shell 28 and core or hub 29 of its drum and secured by screws or other analogous fastenings 31. The shell 28 has a slot 32 formed therein, through which the strap or band projects, the end walls of the said slot being so shaped as to avoid wear on or injury to the band or strap. The advantage of this construction is that when the band or strap winds on the drum it will pass over the shell and will not be humped or irregularly projected by the fastenings therefor, the latter being fully inclosed. After the band or strap passes around the shell first in engagement with one end wall 33 of the slot 32 and comes over the opposite end wall of said slot the interval between the end walls of the slot will permit the strap or band to regularly and smoothly lie over the adjacent or primarily-coiled portion. Through this construction also the winding and unwinding operations of the straps or bands will be pursued without jerks or irregular movements.

Within the shaft 17 a coil-spring 34 is arranged and connected at one end directly to the inner terminal of one plug or stub 23, the said connected end of the spring being formed with a hook 35, which is fitted in an opening 36 in the said plug. This spring may be as long as the dimensions and weight of the shutter or closure 10 may demand to arrive at a counterbalancing effect, and in some instances the said spring may extend throughout the greater part of the length of the shaft. In some instances it will be necessary to use two springs, one attached to each plug to meet the contingencies of a very heavy shutter or closure from a counterbalancing standpoint. Under ordinary conditions, however, only one spring will be necessary, and in either event the inner terminal of the spring will be suitably attached to the spindle or shaft. The manner of attaching the inner end of the spring will be by means of a loop 37, secured to the shaft and arranged to receive the inner terminal of the spring, as shown by Fig. 1, the end of the spring being held in secured relation to the loop by a pin 38. Many other modes of attaching the inner terminal of the spring might, however, be adopted.

On the shaft or spindle 17 near the drums 27 winding-sleeves 39 are secured and formed with intermediate convex winding enlargements 40, gradually inclining inwardly toward opposite ends of the sleeves. The cords or cables 14 wind on the sleeves 39 inwardly from the outer terminals of the latter, said cords or cables passing under the sleeves 39, then upwardly against the rear portions, and downwardly over the forward parts. The straps or bands 11 wind and unwind in reverse directions to their drums relatively to the winding and unwinding of the cords or cables 14. In other words, the straps or bands 11 pass over the outer portions of the drums and rearwardly down over the rear parts of the latter. The advantage of this arrangement is that the winding and unwinding strain or tension is equalized in the spring, or the latter is permitted to remain in normal condition or free of excess counteracting twisting and untwisting movements, and the life thereof is prolonged and its determined resiliency necessary to obtain the operation desired is preserved for a greater length of time. By having the cords or cables 14 and the straps or bands 11 wind in reverse directions and also unwind in opposition to each other the opposing forces imposed on the spring are neutralized and the winding strength of the counterbalancing mechanism, including the spindle or shaft 17, is increased to such an extent as to dispense with the use of auxiliary weights, tracks, and other devices to assist in the operation of the shutter or closure 10. The cords or cables 14 also extend inwardly at angles of inclination from the clips or attaching-plates 13ª to the outer extremities of the sleeves 39, as clearly shown by Fig. 1, to institute a bracing action on the shutter or closure 10. Furthermore, by having the sleeves 9 formed with convex winding enlargements 40 the cords or cables 14 will have the leverage thereon gradually increased and decreased in the unwinding and winding operations at such times when the spring 34 will be benefited by such increase and decrease in accordance with the position and resistance offered by the shutter or closure 10. To prevent the coils of the cords or cables 14 from slipping on the drums or winding enlargements 40, the latter are grooved, as at 41, in reverse directions toward their outer ends, the several grooves being inclined, as shown.

To start the shutter or closure 10 to move from either a fully-closed position or an open arrangement thereof and assist the winding and unwinding mechanism, a strap-loop or analogous device 42 is secured to the outer side of the shutter and adapted to be engaged by a suitably-hooked iron or other means. In some instances this loop 42 may be manually grasped to arrive at the starting operation sought to be effected.

The improved shutter or closure when open, as shown by Fig. 2, will provide a shed or protecting means with respect to the opening which it is adapted to control, and when the shutter is in such position it also serves as a shelter when used in connection with warehouses, freight-houses, and the like, for the ends of wagons which may be backed up against the opening for loading and unloading purposes. It will be observed from the foregoing disclosure that an application of the shutter in operative relation to an opening may be had without requiring the formation of slots or passages through the wall or support for the shutter, which is a material advantage in the reduction of expense in application. It will also be understood that changes in the proportions, dimensions, form, and minor details of the invention may be resorted to without departing from the principle involved.

Having thus fully described the invention, what is claimed as new is—

1. A shutter, means for pivotally mounting and guiding one end of the shutter, winding elevating means attached to said guided end, and winding counteracting supporting means attached to the opposite end of the shutter, said elevating and supporting means winding and unwinding in reverse order.

2. A shutter, means for pivotally mounting and guiding one end of the shutter, a winding-shaft, winding elevating means attached to said guided end of the shutter and to said shaft, and a winding suspending means secured to said shutter and said shaft, and winding and unwinding in opposition to said elevating means.

3. A shutter, means for guiding one end of the shutter elevating-straps secured at the guided end thereof, supporting-cords secured to the opposite end thereof, and a spring-controlled shaft engaged by the straps and cords, the latter coiling on the shaft in reverse direction from the former.

4. A shutter, means for guiding one end of the shutter straps secured at the guided end of the shutter for elevating it, cords secured to the opposite end of the shutter for supporting the shutter during elevation, a spring-controlled shaft about which the cords and straps are wound in reverse directions, and means for supporting the shutter when elevated.

5. A shutter, means for guiding one end of the shutter straps secured at the guided end of the shutter for elevating it, cords secured to the opposite end of the shutter for supporting the shutter during elevation, a spring-controlled shaft about which the cords and straps are wound in reverse directions, and a cable for supporting the shutter when elevated.

6. A shutter, means for guiding one end of the shutter elevating means secured to the guided end of said shutter, supporting means secured to the opposite end of the shutter, and a spring-controlled shaft about which said elevating means and supporting means are wound in reverse directions.

7. A shutter, a spring-controlled shaft, elevating means connected to the lower end of the shutter and wound about the shaft, supporting means secured to the opposite end of the shutter, and wound about the shaft reversely to the elevating means, and a cable for supporting the shutter when elevated.

8. The combination with a support, guides supported thereby, a shutter arranged intermediate the guides, a slide mounted within each guide and connected to the lower end of shutter, straps connected to the slides, supporting-cords connected to the upper end of shutter, and a spring-controlled shaft about which said straps and cords are wound in reverse directions.

9. The combination with a support, of guides secured thereto, a shutter arranged intermediate the guides, slides movably mounted in the guides and having pivotal connection with the lower end of the shutter, straps secured to the slides, supporting-cords secured to the shutter at the end opposite its pivotal connection with the slide, and a spring-controlled shaft about which said straps and cords are wound in reverse directions.

10. The combination with a support, of guides secured thereto, a shutter arranged intermediate the guides, slides movably mounted in the guides and having pivotal connection with the lower end of the shutter, straps secured to the slides, supporting-cords secured to the shutter at the end opposite its pivotal connection with the slides, a spring-controlled shaft about which said straps and cords are wound in reverse directions, and a suspending-cable attached to the support and to the shutter.

11. In a device of the class set forth, the combination of a support, brackets secured to opposite portions thereof and formed with openings, a tubular shaft arranged between the brackets, sleeves inserted in the ends of the shaft and secured thereto, plugs inserted through the sleeves and having outer flanged terminals means for preventing turning of the plug, a spring attached to the inner end of the plug and to the shaft, and a slidable shutter connected to and held balanced by the shaft.

12. In a device of the class set forth, the combination with a support, of brackets secured to said support and formed with openings, one of said brackets having an inwardly-projecting collar, a tubular shaft arranged between and supported by the brackets, a sleeve inserted in and secured to one end of the shaft and projected into the bracket having the collar, a plug inserted through the bracket and extending into the shaft, the outer end of the plug being secured to the bracket, a spring connected to the plug and to the shaft and inclosed by the latter, and a slidable shutter connected to and held balanced by the shaft.

13. In a device of the class set forth, the combination with a support, of brackets secured to opposite portions thereof and formed with openings, one of the brackets having an inwardly-projecting collar, a tubular shaft arranged between and supported by the brackets, a sleeve secured to one end of the shaft and projected into the bracket-opening, a plug inserted through the bracket and extending into the shaft, the outer end of the plug being secured to the bracket, a spring connected to the plug and to the shaft, a shutter slidably mounted below the bracket, means wound about the shaft for elevating the shutter, and means reversely wound about the shaft for suspending the shutter during elevation.

JOHN CAHILL.

Witnesses:
H. F. BELL,
JNO. P. McCOY.